Feb. 16, 1965  S. A. ABRUZZINO  3,169,781
SAFETY NET FOR VEHICLE OCCUPANTS
Filed Jan. 8, 1963  2 Sheets-Sheet 1

INVENTOR.
SAMUEL A. ABRUZZINO
BY
Jerome R. Cox
ATTORNEY

Feb. 16, 1965 S. A. ABRUZZINO 3,169,781
SAFETY NET FOR VEHICLE OCCUPANTS
Filed Jan. 8, 1963 2 Sheets-Sheet 2

INVENTOR.
SAMUEL A. ABRUZZINO
BY
Jerome R. Cox
ATTORNEY 3,169,781
SAFETY NET FOR VEHICLE OCCUPANTS
Samuel A. Abruzzino, 3480 Riverside-Airport Road,
Zanesville, Ohio
Filed Jan. 8, 1963, Ser. No. 250,135
2 Claims. (Cl. 280—150)

The invention involved in this application relates to safety devices.

The embodiment disclosed and claimed consists of a safety device for use in an automobile. It relates to a device for preventing injuries to occupants of automobiles in case of sudden stops or in cases of accidents to the automobiles. The embodiment disclosed comprises in general a net to be secured in the automobile rearwardly of the front seat so that occupants of the back seat will be protected from being thrown forward against the back seat in the event that the automobile is stopped suddenly either by braking or by being involved in an accident with another vehicle or with a stationary object.

One of the objects of my invention therefore is the provision of means for preventing injuries to occupants of automobiles.

A further more specific object of my invention is the provision of a safety net for the protection of the occupants of the rear seat of an automobile.

A further much more specific object of my invention is the provision of a safety device for an automobile in which a length of shock cord is fastened at its ends to two spaced points in the floor of the automobile and intermediate its ends is secured to coat hooks of the automobile and another length of shock cord extends from intermediate points of said first mentioned length to form a transverse supporting member, and a net is connected to the two lengths of shock cord.

One of the features of my invention is the provision of means for protecting children while on the rear seat of an automobile while at the same time allowing the children substantial freedom of movement.

Further objects, advantages and features of my invention will be apparent from the following specification and claims and from a consideration of the accompanying drawings.

*Detailed description*

Figure 1:
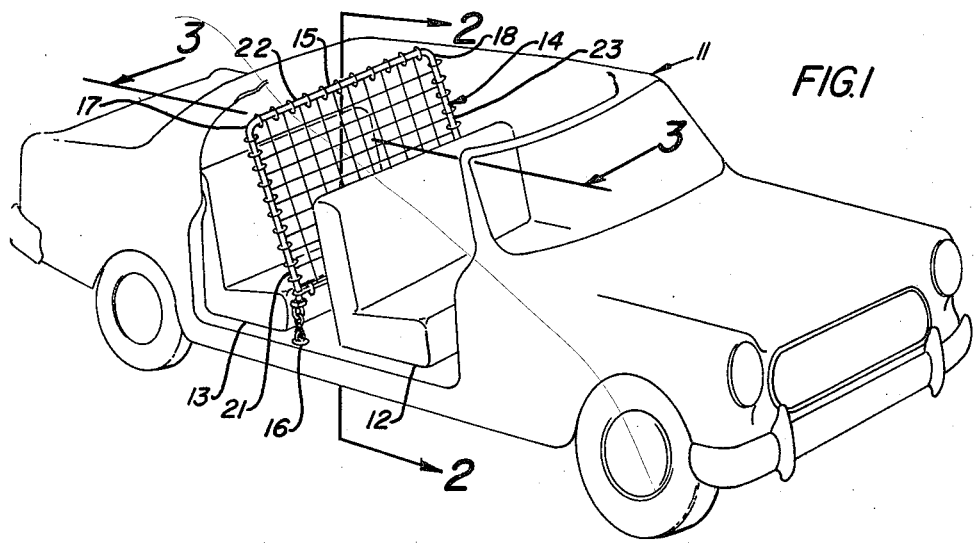
FIG. 1 is a view in perspective of an automobile equipped with an embodiment of my invention having a portion of the automobile broken away so as to show the structure more clearly.

It will be seen that there is shown in FIG. 1 an automobile generally designated 11 having a front seat 12 and a rear seat 13.

Rearward of the front seat 12 I provide a safety net generally designated 14. The sides, top and bottom of this net are made up of aircraft carrier shock cord. Thus the two vertical sections or legs and the upper section or leg all comprise one piece of aircraft carrier shock cord 15 which extends upward from its connection at 16 to the floor of the automobile to a corner 17 where it is connected to one of the coat hooks 19 of the automobile and then extends transversely to another corner 18 where it is connected to another coat hook 19a of the automobile and then extends downward to a point 28 (spaced from the point 16) where it is connected to the floor board on the opposite side of the car. The vertical leg 21, the horizontal leg 22, and the other vertical leg 23 thus form support members for the net and are formed by the one continuous length of shock cord 15. The lower transverse supporting member 24 extends from the leg 21 to the leg 23.

The netting (consisting of vertically extending cords such as 25 and horizontally extending cords such as 26) is connected to the upper cross member 22 and the lower cross member 24 and to the one vertical member 21 and the other vertical member 23, thus forming a netting which restrains the occupants of the rear seat of the car from being propelled (and even from throwing themselves) into the rear of the front seat of the car. The netting, consisting of vertical members such as 25 and cross members such as 26, is generally designated 27 and may be made up of cords of any character, but preferably of a soft material such as a textile material or an elastic material such as rubber.

Figure 2:
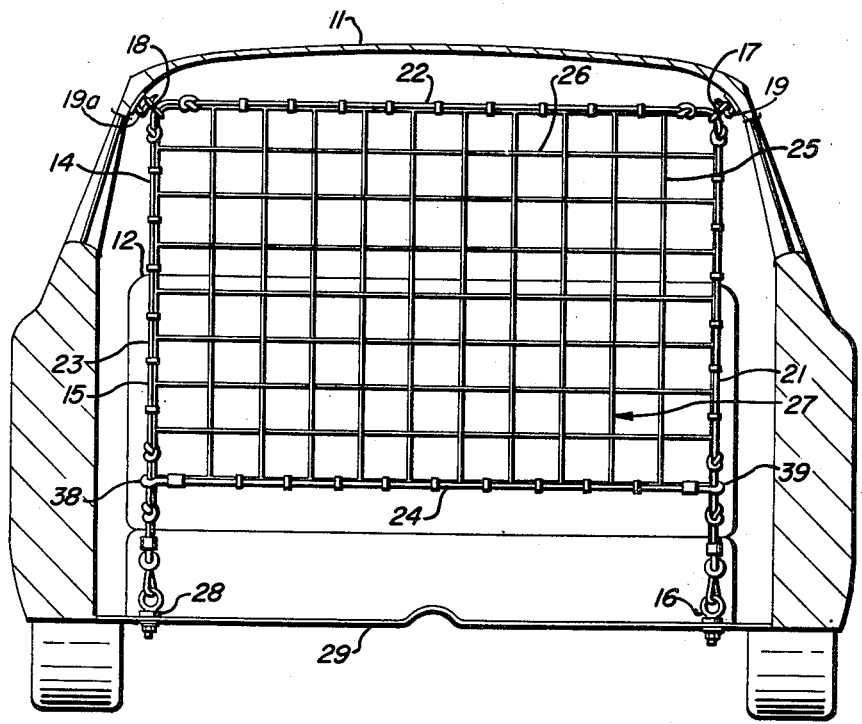
FIG. 2 is a view in vertical section taken substantially on the line 2—2 of FIG. 1.
Figure 3:
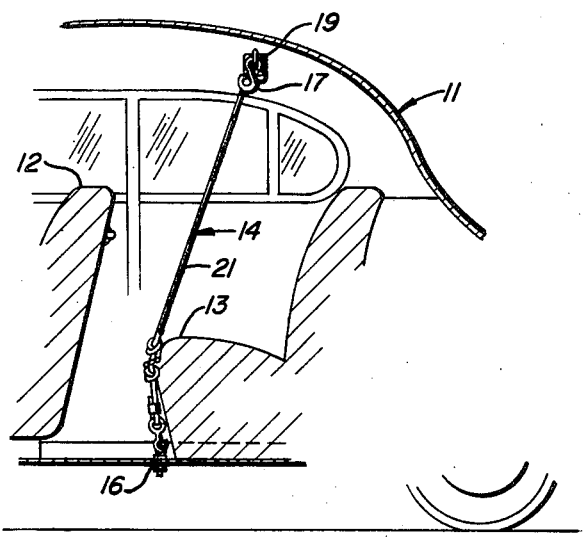
FIG. 3 is a fragmentary view in vertical section taken longitudinally of the automobile substantially on the line 3—3 of FIG. 1.

In FIG. 2 most of the above described elements are also shown and in addition the connection at 28 to the floor board 29 is also shown. FIG. 3 shows some of the above described elements from another view.

Figure 4:
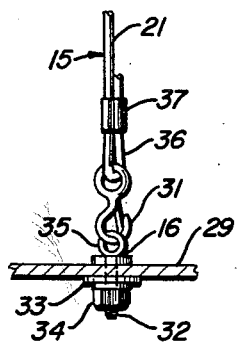
FIG. 4 is a fragmentary view partly in elevation and partly in vertical section of a detail of the connection of the safety net with the floor of the automobile.

In FIG. 4 it may be seen that the vertical leg 21 is secured to the floor 29 as at 16 by a structure which includes a snap hook 31 (similar to a harness snap), a bolt 32, a washer 33 and a nut 34. The bolt 32 has, at its upper end, a ring 35 with which the hook 31 engages. The lower end of the vertical leg 21 of member 15 is formed with a loop 36 having the end thereof secured to the main body of the leg 21 as at 37. The connection at 28 is identical with the connection at 16.

Figure 5:
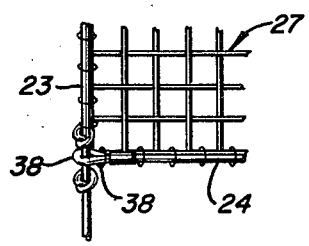
FIG. 5 is a fragmentary view in elevation showing a connection between the lower transverse member of the safety net and one of the vertical legs of the safety net.

In FIGS. 2 and 5, it may be seen that the transverse member 24 is secured to the vertical legs 23 and 21 by means of loops 38 and 39 respectively. Knots are preferably formed in the vertical legs 21 and 23 above and below the loops 38 and 39 in order to prevent excessive movement upward or downward of the cross member 24. The connection at the opposite end of the transverse supporting member 24 to the vertical supporting leg 21 is identical with the connection shown at 38 and is indicated in FIG. 2 by the numeral 39.

Figure 6:
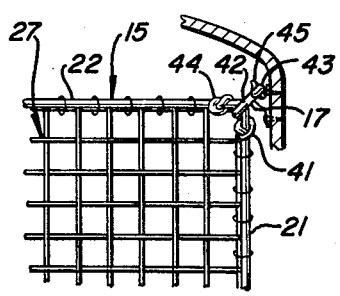
FIG. 6 is a fragmentary view partly in elevation and partly in vertical section showing one of the upper corner connections between the safety net and the side of the automobile.

Details of the connection at 17 are shown in FIG. 6 and inasmuch as the connection 18 is identical the description only of the connection at 17 is believed to be sufficient. The vertically extending support leg 21 is knotted as at 41 and then passes through the lower ring 42 of a double loop or figure of eight link comprising the ring 42 and the ring 43. The transverse leg 22 is also knotted as at 44. Thus the cord 15 cannot slip appreciably in the ring 42. The ring 43 of the figure of eight link is connected on the hook 45 which forms a coat hook for the automobile. The connection at 18 is identical with the connection at 17.

I prefer that the vertically extending supporting legs 21 and 23 shall contact the front portion of the rear seat 13. As indicated in FIGS. 1 and 3, the connections at 16 and 28 are fairly near the front of the seat 13 and the vertical supporting legs 21 and 23 are bent where they contact the front of the rear seat 13. I consider that this adds to the safety of the net and prevents the children on the back seat from sliding down below the top of the seat in front of the net. The resiliency of the member 15 and of the cross member 24 provide supports for the safety net which thus yields in the event that the children should come into contact therewith and at the same time restrains them so that they may not get out of the rear seat and may not be thrown into contact with other objects such as the front seat 12 which would be injurious.

It is believed that the operation of this device is obvious from its description. The hooks (corresponding to the hook 31) are secured in the rings (such as the ring 35) secured to the floor board on opposite sides of the car. The occupants (e.g. children) are placed in the rear seat. The net is then stretched upward, the cord 15 being extended slightly and the upper rings of the figure of eight links (such as the ring 43) are secured to the coat hooks of the car (such as the coat hook 45). In the event of a sudden stop (whether from quick braking or from an accident) the net 14 restrains the children from leaving the back seat and in view of its resiliency, prevents injury to the children.

It is to be understood that the above described embodiments of my invention are for the purpose of illustration only and various changes may be made therein without departing from the spirit and scope of my invention.

I claim:

1. A safety device for an automobile having a pair of coat hanger hooks, a front seat, a rear seat, and having a floor comprising
    a length of shock cord adapted to be secured at its opposite ends to the floor of the automobile and having figure-of-eight links at two intermediate points adapted to be connected to the coat hanger hooks of the automobile thus forming two vertical legs and one transverse leg and the legs forming supporting members;
    snap hooks secured to the ends of said shock cord;
    rings adapted to be securely fastened to the floor boards and connected respectively to said snap hooks;
    a transverse supporting member also formed of shock cord connected to the two vertical legs of the device, and
    a net formed of soft vertical resilient textile strands and horizontal resilient textile strands connected to the vertical supporting members and transverse supporting members, all of which is adapted to be positioned rearwardly of the front seat of said automobile and to contact the front of the rear seat.

2. In combination,
    an automobile having a pair of coat hanger hooks, a front seat, a rear seat, and a floor;
    a length of shock cord secured at its opposite ends to the floor of the automobile and connected at two intermediate points to the coat hanger hooks of the automobile thus forming two vertical legs and one transverse leg and the legs forming supporting members;
    snap hooks secured at the ends of said shock cord;
    rings securely fastened to the floor boards of the automobile and connected to the snap hooks;
    a transverse supporting member also formed of the shock cord connected to the two vertical legs of the device and spaced substantially vertically below said transverse leg; and
    a net formed of soft vertical resilient textile strands and soft horizontal resilient textile strands connected to the vertical supporting members and transverse supporting members, all of which is positioned rearwardly of the front seat and contacts the front of the rear seat.

References Cited in the file of this patent
UNITED STATES PATENTS

| 641,278 | Dick | Jan. 16, 1900 |
| 713,922 | Russell | Nov. 18, 1902 |
| 1,461,648 | Bryant | July 10, 1923 |
| 2,123,268 | Young | July 12, 1938 |
| 2,450,595 | Jones | Oct. 5, 1948 |
| 2,595,329 | Brooks | May 6, 1952 |
| 2,706,819 | McClure | Apr. 26, 1955 |
| 2,740,642 | Atwood | Apr. 3, 1956 |

FOREIGN PATENTS

| 868,261 | Germany | Feb. 23, 1953 |
| 845,079 | Great Britain | Aug. 17, 1960 |